(12) United States Patent
    Kogure

(10) Patent No.: US 9,763,261 B2
(45) Date of Patent: Sep. 12, 2017

(54) MOBILE STATION, COMMUNICATION SYSTEM, ALLOCATION APPARATUS, AND ALLOCATION METHOD

(71) Applicant: NEC Corporation, Tokyo (JP)

(72) Inventor: Yuki Kogure, Tokyo (JP)

(73) Assignee: NEC CORPORATION, Tokyo (JP)

( * ) Notice: Subject to any disclaimer, the term of this patent is extended or adjusted under 35 U.S.C. 154(b) by 36 days.

(21) Appl. No.: 14/762,074

(22) PCT Filed: Oct. 18, 2013

(86) PCT No.: PCT/JP2013/006192
§ 371 (c)(1),
(2) Date: Jul. 20, 2015

(87) PCT Pub. No.: WO2014/125530
PCT Pub. Date: Aug. 21, 2014

(65) Prior Publication Data
US 2015/0358987 A1    Dec. 10, 2015

(30) Foreign Application Priority Data

Feb. 13, 2013 (JP) ................................. 2013-025138

(51) Int. Cl.
*H04W 72/12*    (2009.01)

(52) U.S. Cl.
CPC ... *H04W 72/1205* (2013.01); *H04W 72/1221* (2013.01); *H04W 72/1247* (2013.01);
(Continued)

(58) Field of Classification Search
CPC ......... H04W 72/1205; H04W 72/1221; H04W 72/1252; H04W 72/1284; H04W 72/1289; H04W 72/1247
See application file for complete search history.

(56) References Cited

U.S. PATENT DOCUMENTS 8,059,597 B2    11/2011 Park
2005/0107110 A1*  5/2005 Vasudevan ............ H04W 36/34
                                                    455/525
(Continued)

FOREIGN PATENT DOCUMENTS

JP    2003-500954    1/2003
JP    2007-266753    10/2007
(Continued)

OTHER PUBLICATIONS

International Searching Authority, "Written Opinion of the International Searching Authority", [database online], [retrieved on Nov. 10, 2016] Retrieved from the Patentscope database of the World Intellectual Property Office using Internet <URL: https://patentscope.wipo.int/search/docservicepdf_pct/id00000030215056/ETWOS/WO2014125530.pdf>.*
(Continued)

*Primary Examiner* — Omar Ghowrwal
(74) *Attorney, Agent, or Firm* — Young & Thompson

(57) ABSTRACT

The disclosed allocation apparatus appropriately selects a mobile station for which uplink scheduling is needed. An allocation apparatus (12) according to a present embodiment includes a selection unit (13) that selects, from a plurality of mobile stations ($11_1$ to $11_M$), a target mobile station that serves as a target for which uplink scheduling is to be performed. The selection unit (13) selects a target mobile station based on an elapsed time from a timing at which uplink scheduling is previously performed for at least one mobile station of the plurality of mobile stations ($11_1$ to $11_M$).

20 Claims, 10 Drawing Sheets

(52) U.S. Cl.
CPC ... *H04W 72/1252* (2013.01); *H04W 72/1284* (2013.01); *H04W 72/1289* (2013.01)

(56) References Cited

U.S. PATENT DOCUMENTS

| | | | |
|---|---|---|---|
| 2006/0002336 A1 | 1/2006 | Stanwood et al. | |
| 2007/0019668 A1* | 1/2007 | Lee | H04W 52/281 370/458 |
| 2007/0280168 A1 | 12/2007 | Shibata | |
| 2011/0205975 A1 | 8/2011 | Umesh | |
| 2012/0165034 A1* | 6/2012 | Boudreau | H04W 72/042 455/453 |
| 2012/0190376 A1 | 7/2012 | Rosa et al. | |
| 2012/0281678 A1* | 11/2012 | Chin | H04W 56/0045 370/335 |
| 2013/0090127 A1* | 4/2013 | Nishikawa | H04W 72/082 455/452.1 |

FOREIGN PATENT DOCUMENTS

| | | |
|---|---|---|
| JP | 2007-325115 | 12/2007 |
| JP | 2009049580 A | 3/2009 |
| JP | 2009-296522 | 12/2009 |
| JP | 2010-239431 | 10/2010 |
| JP | 2010539783 A | 12/2010 |
| JP | 2014138311 A | 7/2014 |
| WO | WO 2011/038768 | 4/2011 |

OTHER PUBLICATIONS

Japanese Office Action dated Sep. 13, 2016; Appln. No. 2014-561597.
International Search Report, PCT/JP2013/006192, Nov. 19, 2013.
3 GPP TS 36.321 V9.3.0 (Jun. 2010), Evolved Universal Terrestrial Radio Access (E-UTRA); Medium Access Control (MAC) protocol specification (Release 9).

* cited by examiner

MOBILE STATION, COMMUNICATION SYSTEM, ALLOCATION APPARATUS, AND ALLOCATION METHOD

TECHNICAL FIELD

The present invention relates to a communication system, an allocation apparatus, and an allocation method that select a mobile station that becomes a target of scheduling.

BACKGROUND ART

In the mobile communication system, usually a base station functions as an allocation apparatus that allocates wireless resources of mobile stations. As a method of a mobile communication system, an LTE (Long Term Evolution) system can be cited. In the LTE system, wireless resources are allocated to a plurality of mobile stations at every 1-ms sub-frame by a process called scheduling.

Technologies related to this scheduling process are described in, for example, NPL 1 and PTLs 1 and 2.

A base station in NPL 1 performs scheduling for a mobile station based on the data congestion amount notified from the mobile station.

A base station in PTLs 1 and 2 determines the priority order of mobile stations that are set as targets for scheduling based on downlink allocation information regarding mobile stations.

CITATION LIST

Patent Literature

PTL 1: Japanese Laid-open Patent Publication No. 2009-296522
PTL 2: Japanese Laid-open Patent Publication No. 2007-266753

Non Patent Literature

NPL 1: 3GPP TS 36.321, "Evolved Universal Terrestrial Radio Access (E-UTRA) Medium Access Control (MAC) protocol specification (Release 9)", v.9.3.0. (2010.06)

SUMMARY OF INVENTION

Solution to Problem

By the way, a mobile station cannot notify a base station of a data congestion amount if an uplink wireless resource is not allocated by uplink scheduling. Therefore, in NPL 1, due to the case when the cycle of notification of the data congestion amount set in a mobile station is long or a reason that uplink scheduling is not performed for a long time or the like, there occurs a case where the reporting of the data congestion amount by the mobile station is not performed for some time.

In addition, in PTL 1 and PTL 2, although downlink allocation information is monitored, the case where the reporting of the data congestion amount by a mobile station is not performed for a long time is not taken into account at all.

Therefore, in NPL 1 and PTLs 1 and 2, there are cases where a base station cannot detect the amount of data congestion occurring in a mobile station. Therefore, there arises a problem that the base station cannot appropriately select a mobile station that needs uplink scheduling.

In view of the foregoing problems, an object of the present invention is to provide an allocation apparatus capable of appropriately selecting a mobile station for which uplink scheduling is needed.

Solution to Problem

An allocation apparatus in a present exemplary embodiment includes a selection means for selecting, from a plurality of mobile stations, a target mobile station that serves as a target for which uplink scheduling is to be performed. The selection means selects the target mobile station based on an elapsed time from a timing at which the uplink scheduling for at least one mobile station of the plurality of mobile stations is previously performed.

A communication system in a present exemplary embodiment includes a plurality of mobile stations and an allocation apparatus, and the allocation apparatus has selection means for selecting from among the plurality of mobile stations a target mobile station that serves as a target for which uplink scheduling is to be performed, and the selection means selects the target mobile station based on an elapsed time from a timing at which the uplink scheduling for at least one mobile station of the plurality of mobile stations was performed at a previous time.

A mobile station in the present exemplary embodiment is selected as a target mobile station that serves as a target for which the allocation apparatus performs uplink scheduling, based on the elapsed time from the timing at which the uplink scheduling is previously performed.

An allocation method in a present exemplary embodiment selects, from a plurality of mobile stations, a target mobile station that serves as a target for which uplink scheduling is to be performed, and selects the target mobile station based on an elapsed time from a timing at which the uplink scheduling for at least one mobile station of the plurality of mobile stations was previously performed.

Advantageous Effects of Invention

According to the present invention, it makes it possible to appropriately select a mobile station for which uplink scheduling is needed.

DESCRIPTION OF EMBODIMENTS

Exemplary embodiments of the present invention will be described with reference to the drawings. However, these exemplary embodiments do not limit the technical scope of the present invention.

First Exemplary Embodiment

A communication system in a first exemplary embodiment of the present invention will be described using FIG. 1.

A communication system 10 in the present exemplary embodiment includes a plurality of mobile stations $11_1$ to $11_M$ (M is a positive integer) and an allocation apparatus 12. The allocation apparatus 12 has a selection unit 13. The selection unit 13 selects from among the mobile stations $11_1$ to $11_M$ a target mobile station that serves as a target for which uplink scheduling is to be performed. Note that the selection unit 13 selects a target mobile station based on the elapsed time from a timing at which the uplink scheduling for at least one mobile station of the mobile stations $11_1$ to $11_M$ was performed at the previous time. Incidentally, the uplink scheduling means allocation of an uplink wireless resource. More concretely, a resource block (RB) of an uplink wireless resource composed of a frequency axis and a time axis is allocated to every one of mobile stations. The resource block is one of units for frequency band. Incidentally, in the LTE, one resource block is composed of 12 sub-carriers in a frequency axis direction.

Figure 2:
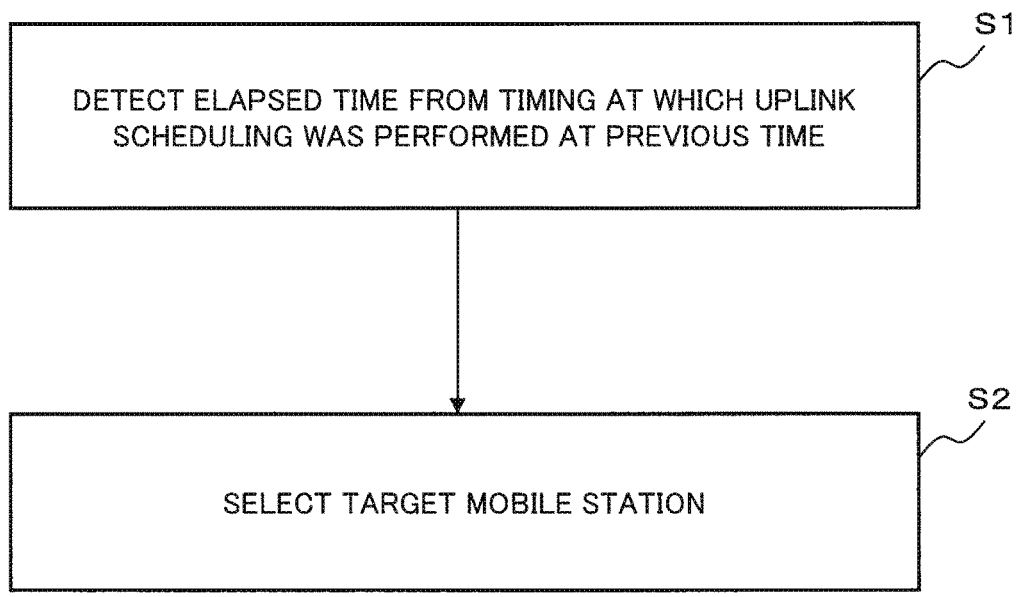
FIG. 2 is a flowchart for describing an operation of the communication system in the first exemplary embodiment of the present invention.

Next, operation of the communication system 10 of the present exemplary embodiment will be described using FIG. 2. The allocation apparatus 12 in the communication system 10 of the present exemplary embodiment detects the elapsed time from the timing at which uplink scheduling was performed for each one of the mobile stations $11_1$ to $11_M$ at the previous time (step S1). Then, based on the elapsed time detected in step S1, the selection unit 13 selects a target mobile station that serves as a target for which uplink scheduling is to be performed (step S2). For example, it is also allowable that the selection unit 13 selects preferentially a mobile station whose elapsed time detected in step S1 is long as a target mobile station. Alternatively, it is also allowable that the selection unit 13 selects a mobile station about which the elapsed time detected in step S1 is longer than or equal to a predetermined time as a target mobile station.

Incidentally, it is also allowable that the allocation apparatus 12 performs step S1 and step S2 in a predetermined cycle.

As in the above description, in the communication system 10 of the present exemplary embodiment, a mobile station that serves as a target for which uplink scheduling is to be performed is selected based on the elapsed time from the timing at which uplink scheduling was performed at the previous time. Having a long elapsed time from the timing at which uplink scheduling was performed at the previous time means that there is a high possibility of occurrence of congestion of transmission data in the mobile station that the allocation apparatus has not detected. That is, by selecting a target mobile station based on the elapsed time, a mobile station having a high possibility of data congestion having occurred can be determined as a target mobile station. Therefore, in the present exemplary embodiment, it becomes possible to appropriately select a mobile station for which uplink scheduling is needed.

Second Exemplary Embodiment

Next, a communication system 20 in a second exemplary embodiment of the present invention will be described using FIG. 3. Incidentally, in conjunction with the present exemplary embodiment, a case where a base station functions as an allocation apparatus that performs the scheduling for mobile stations will be described.

The communication system 20 in the present exemplary embodiment includes a plurality of mobile stations $21_1$ to $21_M$ (M is a positive integer) and a base station 23. The plurality of mobile stations $21_1$ to $21_M$ have notification units $22_1$ to $22_M$, respectively. The notification units $22_1$ to $22_M$ notify uplink data congestion amounts of the mobile stations $21_1$ to $21_M$ to the base station 23. Incidentally, each of the notification units $22_1$ to $22_M$ performs the notification of the uplink data congestion amount when uplink scheduling is carried out after a predetermined time (hereinafter, termed the time A) has elapsed following the unit's own previous performance of notification of the uplink data congestion amount.

The base station 23 includes an antenna unit 24, a reception unit 25, a reception quality measurement unit 27, a control information reception unit 28, a data reception unit 29, a scheduling unit 30, a mobile station management unit 31, a transmission data processing unit 32, a downlink transmission data generation unit 33, and a sending unit 34.

The reception unit 25 includes M number of received signal processing units $26_1$ to $26_M$ that correspond to the mobile stations $21_1$ to $21_M$, respectively. The received signal processing units $26_1$ to $26_M$ separate uplink signals from mobile stations that the antenna unit 24 has received into the received signals of the individual mobile stations and convert the individual signals into base band signals. Then, the received signal processing units $26_1$ to $26_M$ output the base band signals to each of the reception quality measurement unit 27, the control information reception unit 28, and the data reception unit 29.

The reception quality measurement unit 27, based on the input received signals, measures uplink received signal quality for each mobile station and outputs measurement results to the mobile station management unit 31.

The control information reception unit 28 extracts, from the input received signal, information notified from each mobile station about downlink received signal quality, QoS (Quality of Service), an uplink transmission request requesting uplink data transmission and the uplink data congestion amount of the mobile station, and outputs the information to the mobile station management unit 31.

The data reception unit 29 receives uplink data packets from the mobile stations.

The mobile station management unit 31 records information about the mobile stations $21_1$ to $21_M$ received from the reception quality measurement unit 27, the control information reception unit 28, the transmission data processing unit 32, and the scheduling unit 30. Furthermore, the mobile station management unit 31 records the timings at which the scheduling unit 30 performed scheduling in the past. Furthermore, the mobile station management unit 31 outputs information needed for uplink and downlink scheduling to the scheduling unit 30. Note that the information needed for uplink scheduling is, for example, information about the uplink data congestion amount of each mobile station and the uplink transmission request, and information about the timing at which uplink scheduling was performed at the previous time.

The scheduling unit 30 performs the uplink and downlink scheduling for each mobile station. The scheduling unit 30 outputs information that identifies a target mobile station selected as a target for which uplink or downlink scheduling is to be performed to the data reception unit 29, the downlink transmission data generation unit 33, and the sending unit 34. Furthermore, the scheduling unit 30 outputs results of the uplink or downlink scheduling for the target mobile station, in other words, results of allocation of wireless resources, to the mobile station management unit 31. Incidentally, detailed configuration and operations of the scheduling unit 30 will be described later.

The transmission data processing unit 32 outputs the QoS and the presence or absence of downlink transmission data for each mobile station to the mobile station management unit 31. Furthermore, when downlink transmission data is present, the transmission data processing unit 32 outputs that transmission data to the downlink transmission data generation unit 33.

The downlink transmission data generation unit 33, based on the information about the target mobile station for which the scheduling unit 30 has performed scheduling and the transmission data received from the downlink transmission data processing unit 32, creates downlink transmission data and outputs the downlink transmission data to the sending unit 34.

The sending unit 34 sends, to the target mobile station for which the scheduling unit 30 has performed uplink scheduling, an uplink transmission permission signal for notifying an uplink transmission permission and the downlink data transmission control information and the downlink transmission data that have been generated by the downlink transmission data generation unit 33, via the antenna unit 24.

Figure 4:
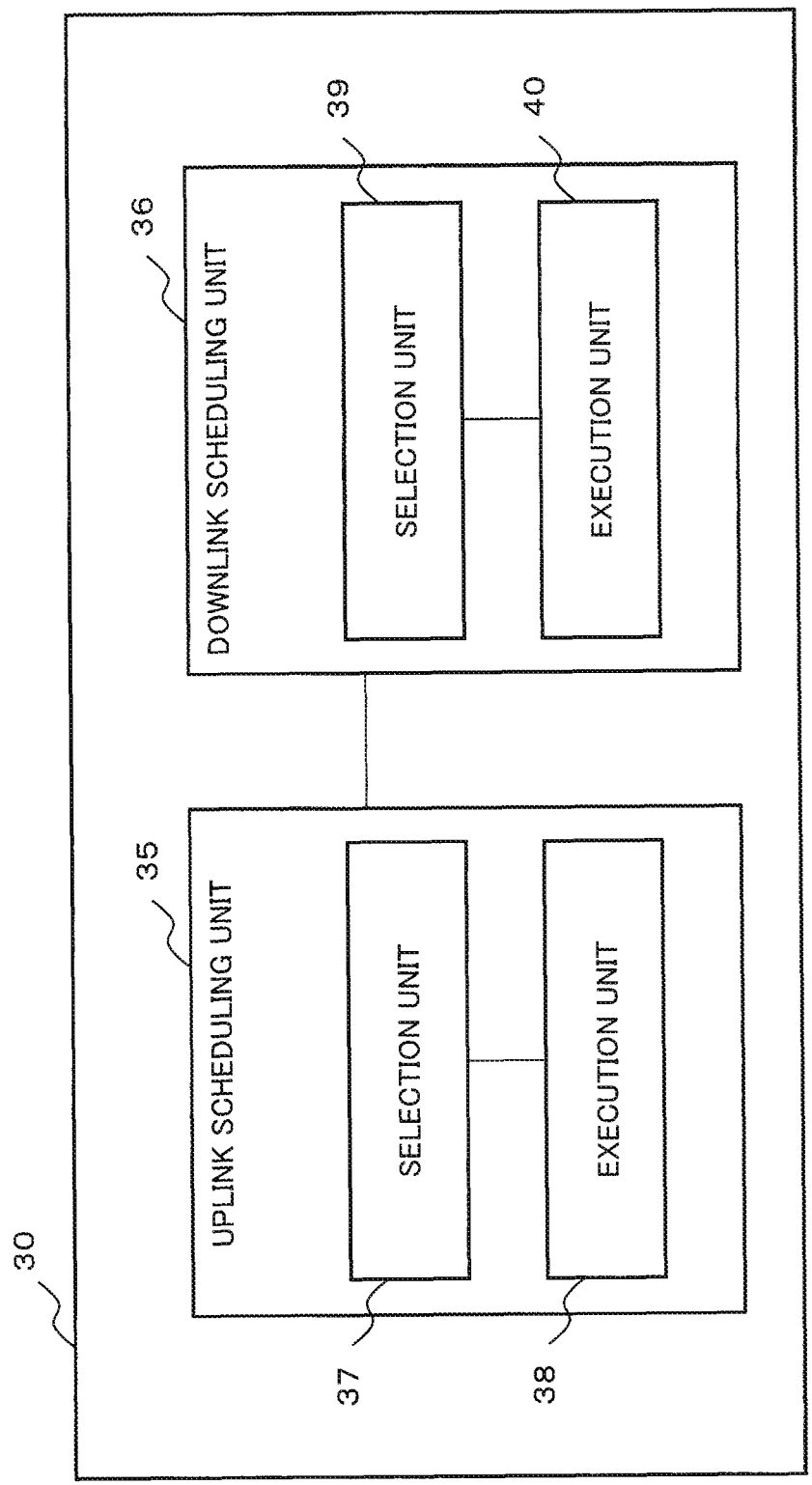
FIG. 4 is a block diagram illustrating a configuration of an allocation apparatus in the second exemplary embodiment of the present invention.

Next, a configuration of the scheduling unit 30 will be described using FIG. 4. The scheduling unit 30 has an uplink scheduling unit 35 that performs uplink scheduling and a downlink scheduling unit 36 that performs downlink scheduling. Furthermore, the uplink scheduling unit 35 and the downlink scheduling unit 36 include selection units 37, 39 and execution units 38, 40, respectively. The selection unit 37 selects from among the mobile stations $21_1$ to $21_M$ a target mobile station for which uplink scheduling is to be performed. The selection unit 39 selects from among the mobile stations $21_1$ to $21_M$ a target mobile station for which downlink scheduling is to be performed. The execution unit 38 performs execution of the uplink scheduling for the target mobile station selected by the selection unit 37, in other words, allocation of an uplink wireless resource. The execution unit 40 performs execution of the downlink scheduling for the target mobile station selected by the selection unit 39, in other words, allocation of a downlink wireless resource.

Figure 5:
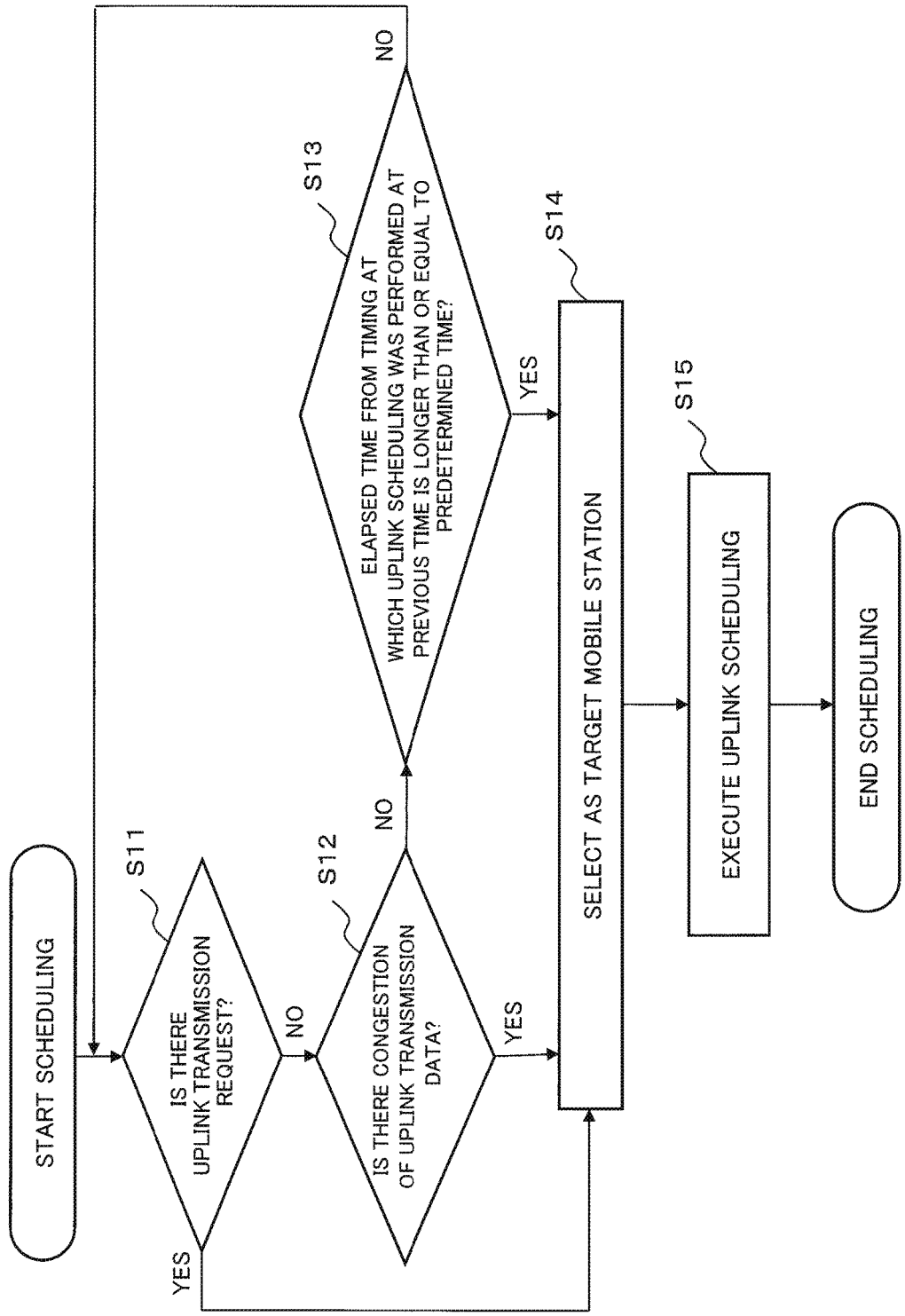
FIG. 5 is a flowchart for describing an operation of the communication system in the second exemplary embodiment of the present invention.

Next, details of an uplink scheduling method by the scheduling unit 30 will be described using FIG. 5.

The selection unit 37 first detects the presence or absence of an uplink transmission request from any one of the mobile stations $21_1$ to $21_M$, based on information output by the mobile station management unit 31 (step S11). Furthermore, the selection unit 37 detects the presence or absence of congestion of transmission data in any one of the mobile stations $21_1$ to $21_M$, based on the uplink data congestion amount output by the mobile station management unit 31 (step S12). Then, the selection unit 37 selects one or more mobile stations about which at least one of steps S11 or S12 results in "YES" as a target mobile station that becomes a target of uplink scheduling (step S14).

Furthermore, the selection unit 37, regarding each of the mobile stations about which neither step S11 nor S12 results in an affirmative determination, detects the elapsed time from the timing at which uplink scheduling was performed at the previous time. In the present exemplary embodiment, it is detected whether or not the elapsed time from the timing at which uplink scheduling was performed at the previous time is longer than or equal to a predetermined time A (step S13). Then, the selection unit 37 selects one or more mobile stations about which step S13 results in "YES" as a target mobile station for which uplink scheduling is to be executed (step S14).

The execution unit 38 executes the uplink scheduling for the target mobile stations that the selection unit 37 has selected in step S14 (step S15). Incidentally, it is also allowable that the execution unit 38 performs uplink scheduling preferentially for a mobile station whose uplink data congestion amount detected in step S12 is large, among the target mobile stations selected in step S14. Alternatively, it is also allowable that the execution unit 38 performs uplink scheduling preferentially for a mobile station whose elapsed time detected in step 13 is long. Alternatively, it is also allowable that the execution unit 38 executes the uplink scheduling for the target mobile stations selected based on step S13 after completing the uplink scheduling with regard to the target mobile stations selected based on steps S11 and S12. As in the above description, the uplink scheduling by the scheduling unit 30 is completed.

Then, the scheduling unit 30 notifies the target mobile stations selected in step S14 to the sending unit 34. Further, the scheduling unit 30 sends the results of the scheduling executed in step S15, in other words, the results of allocation of uplink wireless resources, to the mobile station management unit 31.

As described above, each of the notification units $22_1$ to $22_M$ performs the notification of the uplink data congestion amount when uplink scheduling is performed after the predetermined time A has elapsed following the previous performance of notification of the uplink data congestion amount. Note that the notification units $22_1$ to $22_M$ are able to notify the uplink data congestion amount as the execution unit 38 executes uplink scheduling. Therefore, the timing of the uplink scheduling by the execution unit 38 and the timing of notification of the uplink data congestion amount by the notification units $22_1$ to $22_M$ are consecutive and at substantially the same timing. Specifically, the target mobile station selected based on step S13 is a mobile station that the predetermined time A has passed since notifying the uplink data congestion amount at the previous time. Therefore, the target mobile station selected based on step S13 notifies the uplink data congestion amount to the base station 23 when having received an uplink transmission permission notification signal from the base station 23.

As in the above description, in the present exemplary embodiment, the base station 23 selects target mobile stations for which uplink scheduling is to be performed based not only the uplink data congestion amounts notified from the mobile stations $21_1$ to $21_M$ but also the elapsed times from the timing at which uplink scheduling was performed at the previous time. Therefore, uplink scheduling can be performed not only for the mobile stations that are known to have data congestion but also mobile stations that may have high possibilities of having data congestion.

Incidentally, the predetermined time used as a threshold value in step S13 may be appropriately changed depending on the situation of load of wireless resources in the system to which the base station 23 is applied, a permissible delay time, or the like. The load situation of wireless resources varies depending on the time zone (weekdays, holidays, early morning, daytime, nighttime, or the like). Therefore, it is also allowable to provide a monitor apparatus monitoring the amount of data traffic. Then, it is also allowable to adjust the predetermined time used as a threshold value in step S13, based on monitoring results by the monitor apparatus.

Furthermore, although in the present exemplary embodiment, one or more target mobile stations are selected based on step S13 after selecting one or more target mobile stations based on steps S11 and S12, however, the present exemplary embodiment is not limited to this. Specifically, it is also allowable to select one or more target mobile stations based on steps S11 and S12 after selecting one or more target mobile stations based on step S13.

Third Exemplary Embodiment

By the way, in the case where the mode of an RLC (Radio Link Control) layer that is one of protocol layers of mobile stations is an RLC-AM (Acknowledge Mode) that needs the transmission of an ACK (ACKnowledgement) and where data is sent via a downlink, the ACK transmission from the mobile stations is needed. Note that if the transmission of the ACK from a mobile station is delayed due to a delay in the uplink scheduling, there is a risk of decrease in the throughput in the downlink.

Therefore, in conjunction with a third exemplary embodiment of the present invention, a communication system that performs uplink scheduling by taking into account the mode of a predetermined protocol layer of mobile stations and the data transmission in the downlink will be described.

A configuration of a communication system in the present exemplary embodiment has substantially the same configuration as that of the communication system 20 in the second exemplary embodiment, but there are differences in operations between the scheduling unit 30 and the mobile station management unit 31.

The mobile station management unit 31 in the present exemplary embodiment records information about the amount of downlink transmission data congested in the base station 23 (hereinafter, termed the downlink data congestion amount) and mode information about the predetermined protocol layer, in addition to the information recorded by the mobile station management unit 31 in the second exemplary embodiment. Note that presence of a downlink data congestion amount indicates that the possibility of data transmission occurring in the downlink at a close timing is high. Therefore, by monitoring the downlink data congestion amount, it can be predicted that data transmission in the downlink will be performed. Incidentally, in the present exemplary embodiment, the predetermined protocol layer is an RLC layer. The modes of the RLC layer include an RLC-AM in which transmission of the ACK is needed and an RLC-UM (Unacknowledge Mode) in which transmission of the ACK is not needed. Then, the mobile station management unit 31 outputs information needed for scheduling to the scheduling unit 30. In the present exemplary embodiment, the information needed for scheduling is the downlink data congestion amount and the mode information about the RLC layer, in addition to information about the uplink data congestion amount of a mobile station and the uplink data transmission request as well as the information about the timing of the previous performance of uplink scheduling that are needed in the second exemplary embodiment.

Figure 6:
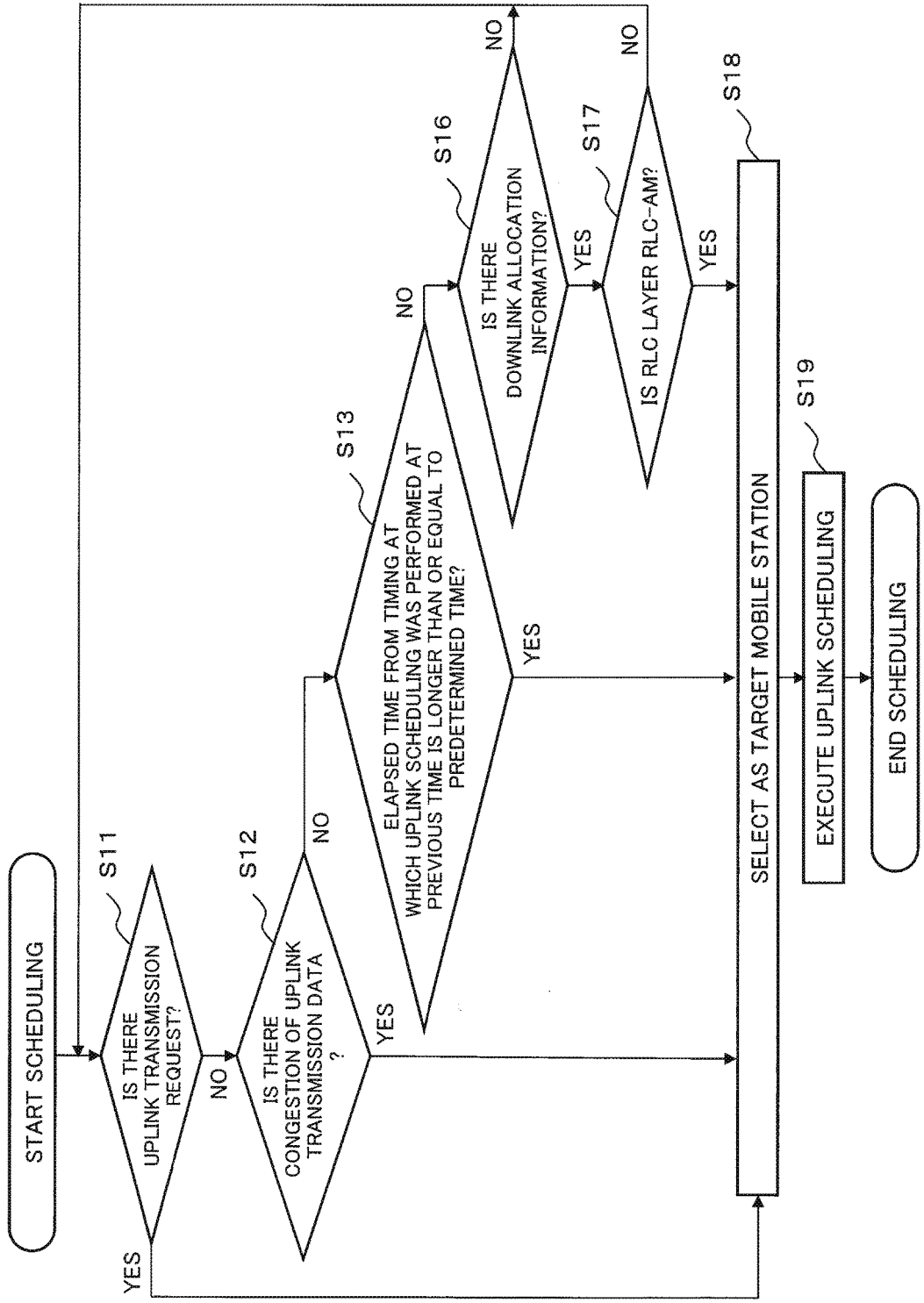
FIG. 6 is a flowchart for describing an operation of a communication system in a third exemplary embodiment of the present invention.

Next, operations of the scheduling unit 30 in the present exemplary embodiment will be described using FIG. 6. Incidentally, step S11 to step S13 are substantially the same as in the second exemplary embodiment, and therefore descriptions thereof will be omitted.

The scheduling unit 30 in the present exemplary embodiment detects, regarding a mobile station about which step S13 has resulted in "NO", whether or not the predetermined protocol layer is in a mode that needs the ACK. Concretely, the scheduling unit 30 detects the presence or absence of a downlink data congestion amount (step S16). Furthermore, the scheduling unit 30 detects whether or not the mode of the RLC layer is the RLC-AM (step S17). Then, the scheduling unit 30 selects a mobile station in which a downlink data congestion amount is present and the mode of the RLC layer is the RLC-AM as a target mobile station (step S18).

Then, the execution unit 38 executes the uplink scheduling for the target mobile stations selected in step S18 by the selection unit 37 (step S19). Through the operation described above, the uplink scheduling by the scheduling unit 30 ends. Incidentally, it is also allowable that the execution unit 38 performs uplink scheduling preferentially for a mobile station which elapsed time is long from the timing at which downlink scheduling was performed at the previous, among the target mobile stations selected based on steps S16 and S17. Due to this, the uplink scheduling for a mobile station that has a high possibility of occurrence of delay in the ACK transmission may be preferentially performed. Therefore, decrease in the downlink throughput can be more effectively prevented.

Incidentally, although the selection unit 37 in the present exemplary embodiment selects one or more target mobile stations based on steps S16 and S17 after selecting one or more target mobile stations based on step S13, the selection unit 37 is not limited to this. For example, it is also allowable to select one or more target mobile stations based on step S13 after selecting one or more target mobile stations based on steps S16 and S17. Alternatively, it is also allowable that the selection unit 37 selects one or more mobile stations that achieve satisfaction in all of steps S13, S16 and S17 as target mobile stations.

Then, the scheduling unit 30 notifies the one or more target mobile stations selected in step S18 to the downlink transmission data generation unit 33 and the sending unit 34. Furthermore, the scheduling unit 30 sends, to the mobile station management unit 31, the results of scheduling performed in step S19, that is, the results of allocation of uplink wireless resources.

As in the above description, in the present exemplary embodiment, a mobile station in which a downlink data congestion amount is present and the mode of the RLC layer is the RLC-AM may be selected as a target mobile station for which uplink scheduling is to be performed. Therefore, the decrease in the throughput in the downlink due to a delay of the ACK may be prevented.

Incidentally, although in the present exemplary embodiment, the presence or absence of a downlink data congestion amount is used for determination of selection of a target mobile station, the present exemplary embodiment is not limited to this. For example, it is also allowable that the mobile station management unit 31 records downlink allocation information that is about results of allocation by the downlink scheduling, and notifies the downlink allocation information to the scheduling unit 30. Note that the downlink allocation information being present indicates that data transmission in the downlink from the base station will occur in the near future. Therefore, it is also allowable that the scheduling unit 30 selects, in steps S16 to S18, one or more mobile stations about which downlink allocation information is present and in which the mode of the RLC layer is the RLC-AM as target mobile stations. Alternatively, it is also allowable that the scheduling unit 30 selects, in steps S16 to S18, one or more mobile stations in which at least one of a downlink allocation information or a downlink data congestion amount is present and in which the mode of the RLC layer is the RLC-AM as target mobile stations. Due to this, the decrease in the throughput in the downlink due to a delay of the ACK may be more effectively prevented.

Fourth Exemplary Embodiment

Next, a fourth exemplary embodiment of the present invention will be discussed. In the third exemplary embodiment, decrease in the throughput in the downlink is prevented by selecting one or more target mobile stations based on the mode information about the RLC layer of each mobile station. However, when the mode of a transport layer or an application layer either of which is a protocol layer higher in order than the RLC layer is a mode that needs the ACK, too, there is a risk of the decrease in the throughput in the downlink due to a delay of uplink scheduling.

Hence, in conjunction with the present exemplary embodiment, a communication system that performs uplink scheduling by taking into account the mode information about the transport layer or the application layer will be discussed.

Figure 7:
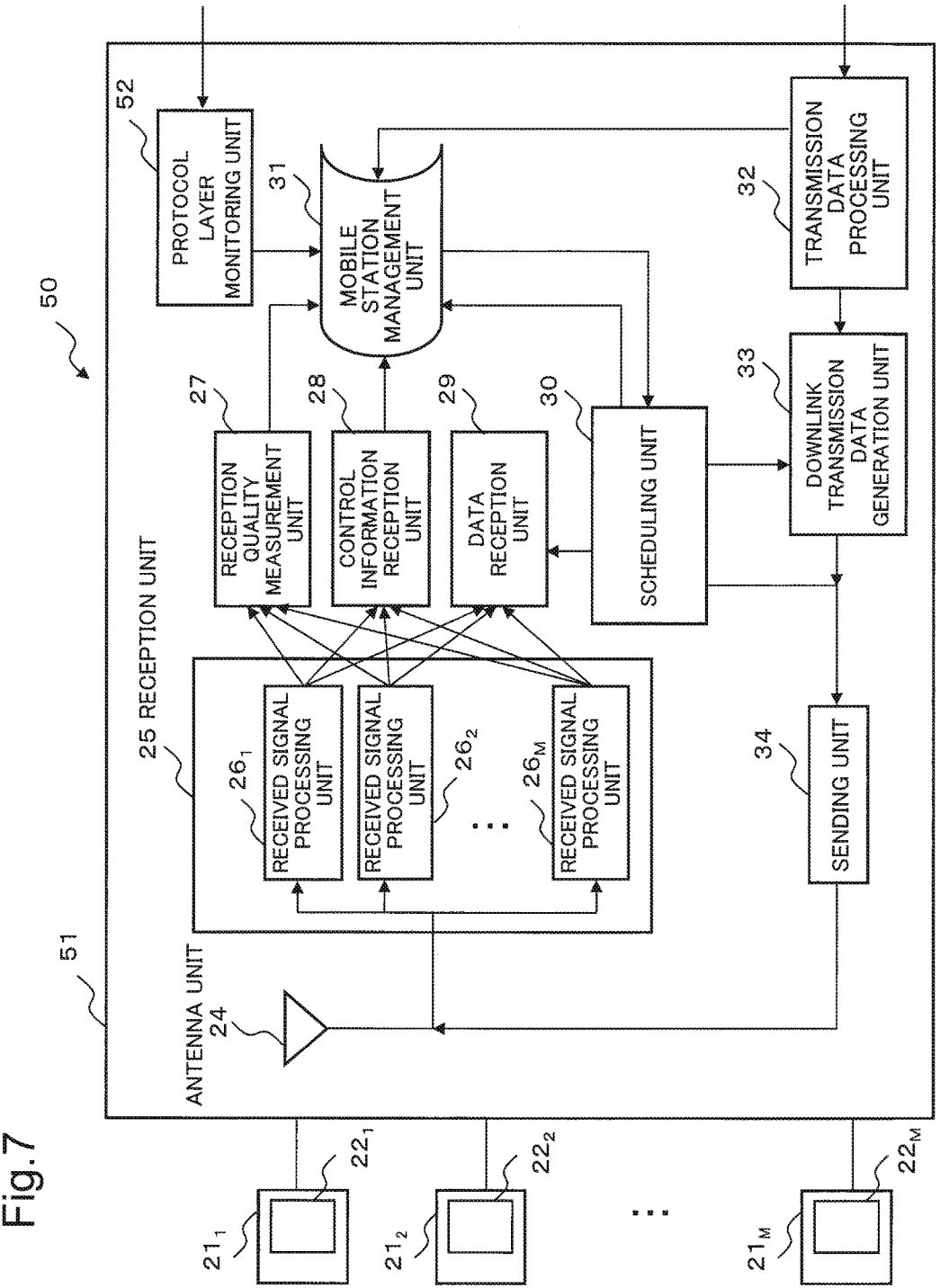
FIG. 7 is a block diagram illustrating a configuration of an allocation apparatus in a fourth exemplary embodiment of the present invention.

A configuration of a communication system 50 in the present exemplary embodiment is illustrated in FIG. 7. Usually, a base station in a system of LTE does not monitor the transport layer or the application layer. Therefore, a base station 51 in the communication system 50 in the present exemplary embodiment includes a protocol layer monitoring unit 52 in addition to the configuration of the base station 23 in the third exemplary embodiment. A protocol layer monitoring unit 52 receives, from an apparatus that has detected the mode of a protocol layer higher in order than the RLC layer, mode information about the higher-order protocol layer. The apparatus that has detected the mode of the higher-order protocol layer is, for example, an apparatus of a core network (CN) such as a GGSN (Gateway Serving GPRS Support Node) or a P-GW (Packet Data Network Gateway). Then, the protocol layer monitoring unit 52 notifies the mode information about the transport layer and the mode information about the application layer to the mobile station management unit 31. Due to this, the mobile station management unit 31 is able to record mode information about not only the RLC layer but also the transport layer and the application layer.

Incidentally, the mode in the transport layer includes the TCP (Transmission Control Protocol), which is a mode that needs the ACK, and the UDP (User Datagram Protocol), which is a mode that does not need the ACK. Furthermore, the mode in the application layer is, for example, the HTTP (Hyper Text Transfer Protocol), which is a mode that needs the ACK, or the SIP (Session Initiation Protocol), which is a mode that does not need the ACK, but is not limited to these.

Figure 8:
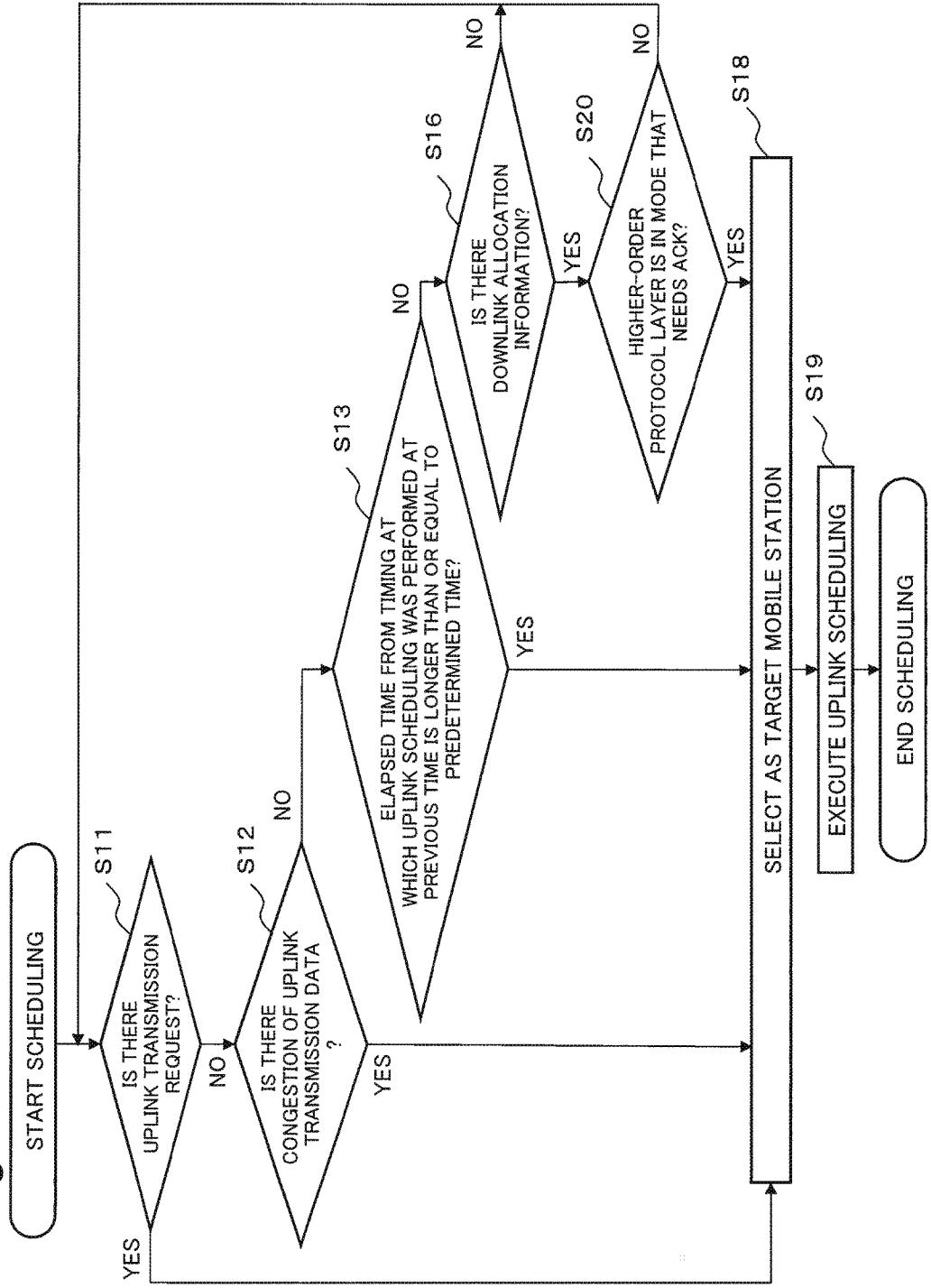
FIG. 8 is a flowchart for describing an operation of a communication system in the fourth exemplary embodiment of the present invention.

Next, operations of the scheduling unit 30 in the present exemplary embodiment will be described using FIG. 8. An operation of the scheduling unit 30 in the present exemplary embodiment is an operation in which the operation of the scheduling unit 30 in step S17 illustrated in FIG. 6 has been changed to that of step S20. Other operations are substantially the same as those in FIG. 6, and descriptions thereof will be omitted.

The scheduling unit 30 in the present exemplary embodiment, in step S20, takes into account the mode of a protocol layer higher in order than the RLC layer. For example, it is permissible that the scheduling unit 30 determines in step S20 whether or not the transport layer is a TCP. Alternatively, it is also permissible to determine whether or not the mode of the application layer is a mode that needs the ACK. Alternatively, it is also permissible that the scheduling unit 30, in step S20, makes a determination of "YES" when, of the RLC layer, the transport layer and the application layer, at least one protocol layer is of a mode that needs the ACK.

Incidentally, although the base station 51 in the present exemplary embodiment receives, from an external apparatus, mode information about a protocol layer higher in order than the RLC layer, the present exemplary embodiment is not limited to this. For example, the communication system in the present exemplary embodiment may be of a SIPTO (Selected IP Traffic Offload) architecture including a configuration in which a RAN (Radio Access Network) is logically accompanied by a function of a core network apparatus. Concretely, it is permissible to adopt a configuration in which a base station is accompanied by a function of a core network apparatus such as GGSN or P-GW. Due to this, the base station will be able to monitor the modes of the transport layer and the application layer, which are higher in order than the RLC layer.

As in the above description, in the present exemplary embodiment, uplink scheduling is performed by taking into account the modes of not only the RLC layer but also a protocol layer that is higher in order than the RLC layer. Therefore, the decrease in the throughput in the downlink due to a delay of the ACK can be more effectively prevented.

Figure 9:
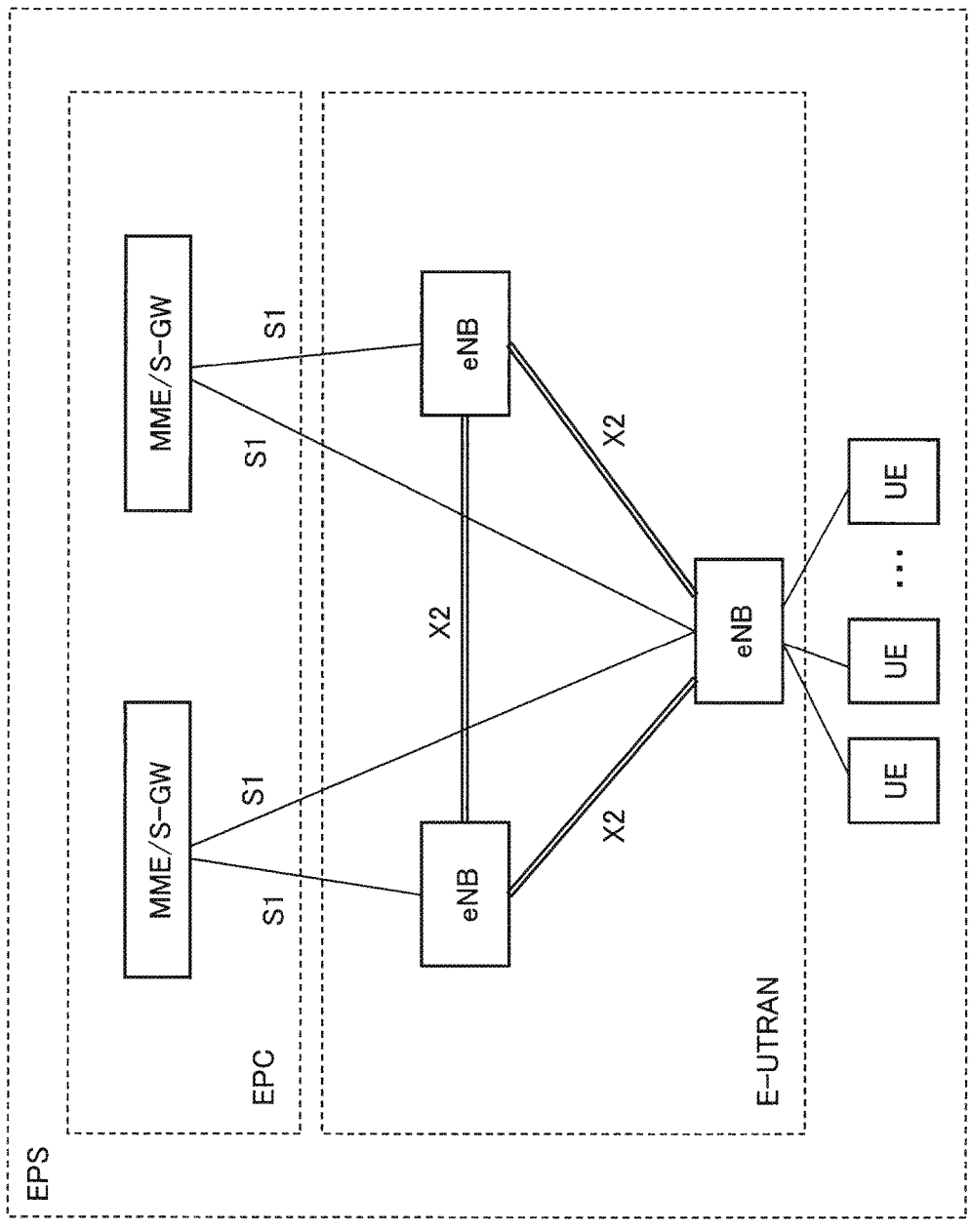
FIG. 9 is a block diagram illustrating a configuration of an LTE system to which a communication system of the present invention has been applied.
Figure 10:
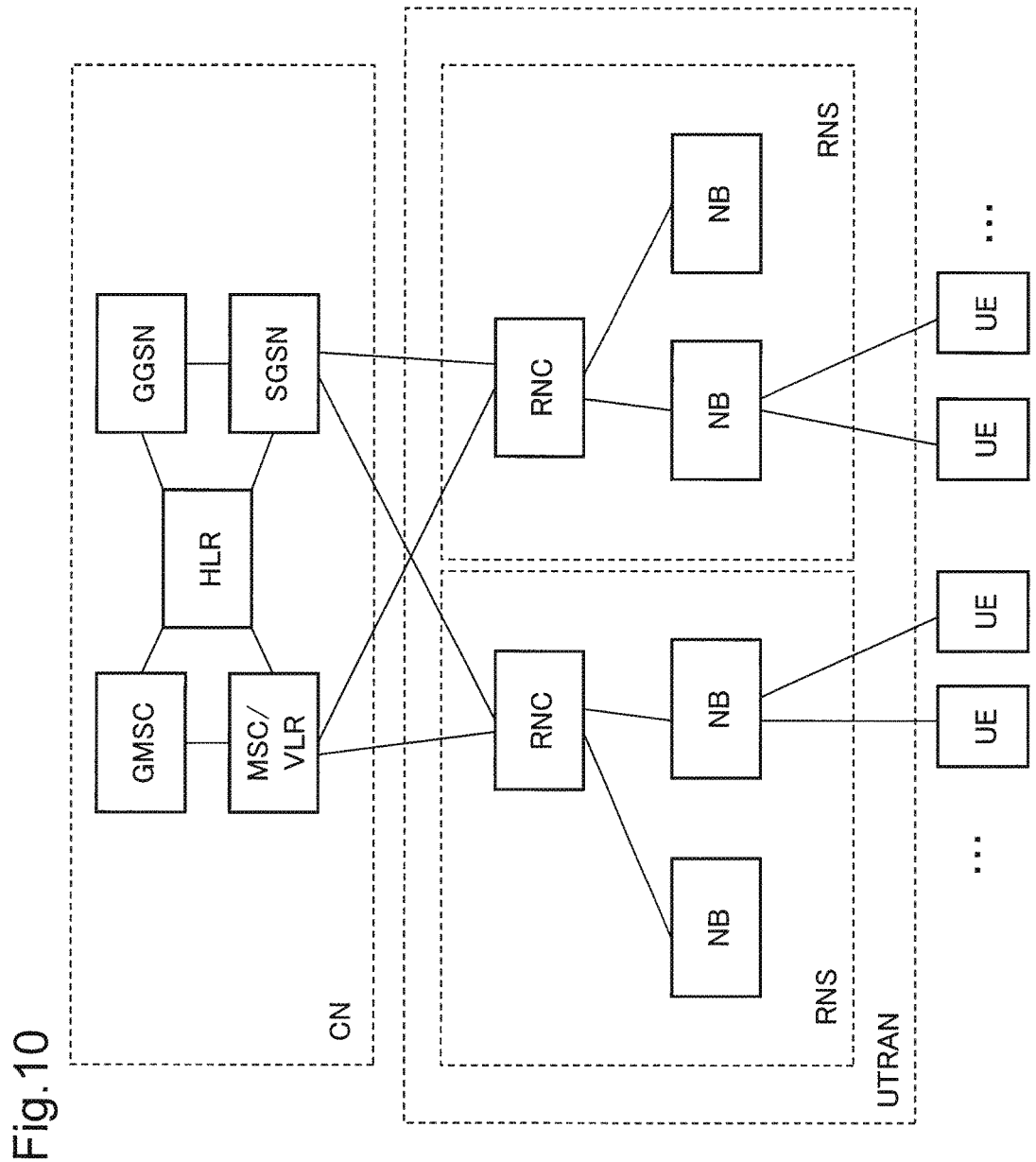
FIG. 10 is a block diagram illustrating a configuration of a WCDMA system to which a communication system of the present invention has been applied.

Incidentally, the communication systems in the first exemplary embodiment to the fourth exemplary embodiment may be applied to, for example, communication systems of LTE and communication systems of WCDMA (registered trademark). Examples of configurations of communication systems of LTE and WCDMA (Wideband Code Division Multiple Access) to which the communication systems in the first exemplary embodiment to the fourth exemplary embodiment are applied are illustrated in FIG. 9 and FIG. 10, respectively. In a communication system of LTE illustrated in FIG. 9, it is allowable that an eNB (Evolved Node B) that is a base station functions as an allocation apparatus. In a communication system of WCDMA illustrated in FIG. 10, it is allowable that an NB (Node B) functions as an allocation apparatus. Incidentally, in the communication system of WCDMA illustrated in FIG. 10, it is also allowable that an RNC (Radio Network Controller) that manages the NB functions as an allocation apparatus.

Furthermore, in the second exemplary embodiment to the fourth exemplary embodiment, although the base station functions as an allocation apparatus that performs scheduling for the mobile stations, the present invention is not limited to this. For example, it is allowable that the allocation apparatus is a control apparatus that controls the base station. As the control apparatus, for example, an RNC, an MCE (Multi-cell/multicast Coordination Entity), and the like may be cited. Alternatively, the allocation apparatus may be an apparatus of a core network. Specifically, it is allowable that an apparatus of a core network centrally performs scheduling for mobile stations under a plurality of base stations. As the core network apparatus, for example, an SGSN (Serving GPRS support node), a GGSN (Gateway GPRS support node), an MME (Mobility Management Entity), and the like may be cited.

Figure 1:
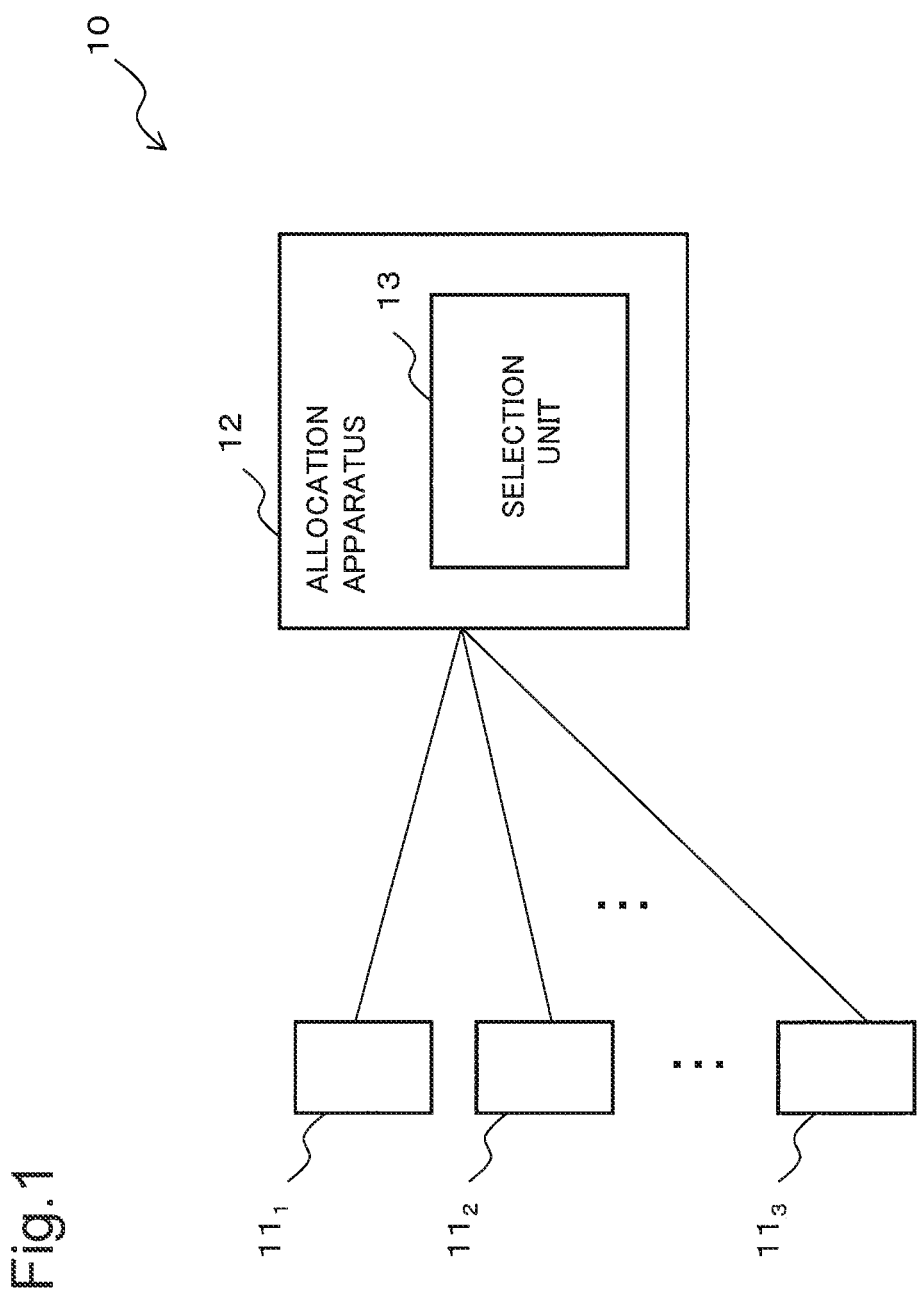
FIG. 1 is a block diagram illustrating a configuration of a communication system in a first exemplary embodiment of the present invention.
Figure 3:
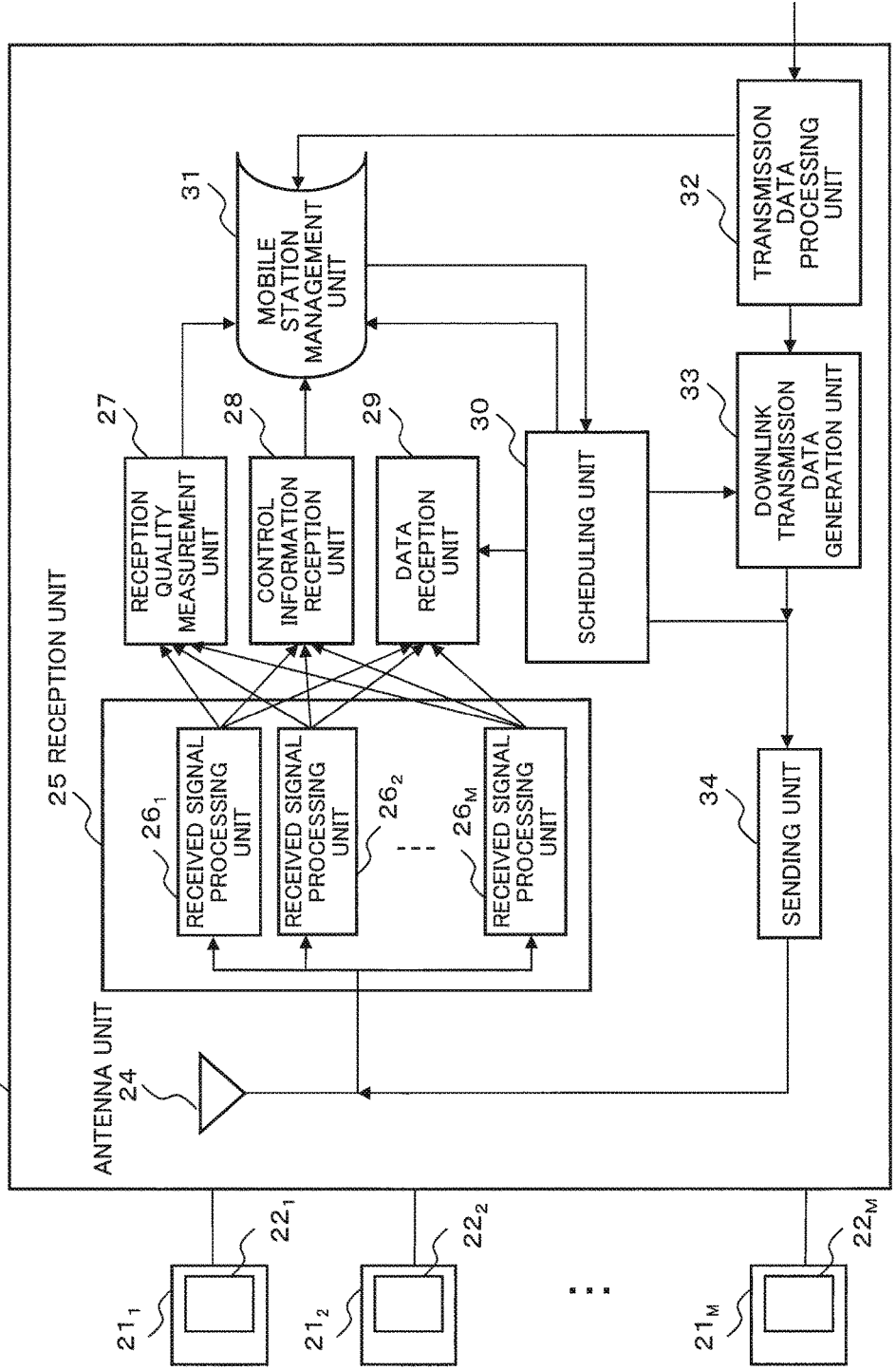
FIG. 3 is a block diagram illustrating a configuration of a communication system in a second exemplary embodiment of the present invention.

Furthermore, it is also allowable that the individual operations of the communication systems described in conjunction with the first exemplary embodiment to the fourth exemplary embodiment are controlled by apparatuses that the communication systems illustrated in FIGS. 1, 3 and 7 have, and a CPU (Central Processing Unit) of another apparatus capable of communicating with the apparatuses. In this case, it goes without saying that the individual operations of the communication systems are accomplished by preparing a recording medium in which program codes of software that realizes the functions of each exemplary embodiment and by the CPU operating as a general-purpose computer that reads out program codes stored in the recording medium.

Incidentally, the programs may be stored using various types of non-transitory computer readable medium, and may be supplied to the computer. The non-transitory computer readable medium includes various types of tangible storage medium. Examples of the non-transitory computer readable medium include magnetic recording media (for example, flexible disks magnetic tapes, hard disk drives), magneto-optical recording media (for example, magneto-optical disks), CD-ROMs (Read Only Memory), CD-Rs, CD-R/Ws, semiconductor memories (for example, mask ROMs, PROMs (Programmable ROM), EPROMs (Erasable PROM), flash ROMs, RAMs (random access memory)). Furthermore, the programs may be supplied to the computer by various types of transitory computer readable medium. Examples of the transitory computer readable medium include electric signals, optical signals, and electromagnetic waves. The transitory computer readable medium is able to supply programs to the computer via a cable transmission path, such as an electric cable or an optical fiber, or a wireless communication path.

Furthermore, in the second exemplary embodiment to the fourth exemplary embodiment, the kind of the base station is not limited. Specifically, the base station may be any one of a macro-base station that configures a macrocell, a pico-base station that configures a picocell, or a femto-base station (HNB (Home NodeB) or HeNB) that configures a femtocell.

A part or the whole of the foregoing exemplary embodiments can be described as in the following Supplementary Notes, but not limited to the following.

(Supplementary Note 1) A communication system including a plurality of mobile stations and an allocation apparatus, wherein the allocation apparatus includes selection means for selecting a target mobile station that serves as a target for which uplink scheduling is to be performed from among the plurality of mobile stations, and the selection means selects the target mobile station based on an elapsed time from a timing at which the uplink scheduling for at least one mobile station of the plurality of mobile stations was performed at a previous time.

(Supplementary Note 2) The communication system according to Supplementary Note 1, wherein the allocation apparatus includes scheduling means for performing the uplink scheduling for the target mobile station.

(Supplementary Note 3) The communication system according to Supplementary Note 2, wherein when a plurality of the target mobile stations is present, the scheduling means preferentially performs scheduling for the target mobile station the elapsed time of which is long.

(Supplementary Note 4) The communication system according to any one of Supplementary Notes 1 to 3, wherein the allocation apparatus further has reception means for receiving an uplink transmission request sent from the mobile stations, wherein the selection means further selects a mobile station that has sent the uplink transmission request as the target mobile station.

(Supplementary Note 5) The communication system according to any one of Supplementary Notes 1 to 4, wherein the selection means selects a mobile station the elapsed time of which is longer than or equal to a predetermined time as the target mobile station.

(Supplementary Note 6) The communication system according to Supplementary Note 5, wherein the mobile station includes notification means for performing notification of an uplink data congestion amount that is an uplink transmission data amount congested at the mobile station to the allocation apparatus, and wherein the notification means performs the notification when the uplink scheduling is performed after the predetermined time has elapsed following previous performance of the notification.

(Supplementary Note 7) The communication system according to Supplementary Note 6, wherein the selection means further selects the target mobile station based on the uplink data congestion amount notified by the notification means.

(Supplementary Note 8) The communication system according to any one of Supplementary Notes 1 to 7, wherein the selection means selects the target mobile station based on the elapsed time, a mode of a predetermined protocol layer in the mobile station, and a downlink data congestion amount that is a downlink transmission data amount congested at the allocation apparatus.

(Supplementary Note 9) The communication system according to any one of Supplementary Notes 1 to 7, wherein the selection means selects the target mobile station based on the elapsed time, a mode of a predetermined protocol layer in the mobile station, and downlink allocation information about the plurality of mobile stations.

(Supplementary Note 10) The communication system according to Supplementary Note 8 or 9, wherein the predetermined protocol layer is at least one of an RLC layer, a transport layer, or an application layer.

(Supplementary Note 11) The communication system according to any one of Supplementary Notes 8 to 10, wherein the allocation apparatus includes protocol layer monitoring means for receiving mode information about the predetermined protocol layer from an external apparatus.

(Supplementary Note 12) The communication system according to any one of Supplementary Notes 1 to 11, further including a configuration of SIPTO in which the allocation apparatus includes one or more of functions of a core network apparatus.

(Supplementary Note 13) The communication system according to any one of Supplementary Note 1 to 12, wherein the allocation apparatus is a base station.

(Supplementary Note 14) The communication system according to any one of Supplementary Notes 1 to 12, wherein the allocation apparatus is a control apparatus that controls a base station.

(Supplementary Note 15) An allocation apparatus including selection means for selecting a target mobile station that serves as a target for which uplink scheduling is to be performed from among a plurality of mobile stations, wherein the selection means selects the target mobile station based on an elapsed time from a timing at which the uplink scheduling for at least one mobile station of the plurality of mobile stations was performed at a previous time.

(Supplementary Note 16) The allocation apparatus according to Supplementary Note 15, including scheduling means for performing the uplink scheduling for the target mobile station.

(Supplementary Note 17) The allocation apparatus according to Supplementary Note 16, wherein when a plurality of the target mobile stations is present, the scheduling means preferentially performs scheduling for the target mobile station the elapsed time of which is long.

(Supplementary Note 18) The allocation apparatus according to any one of Supplementary Note 15 to 17, further including reception means for receiving an uplink transmission request sent from the mobile stations, wherein the selection means further selects a mobile station that has sent the uplink transmission request as the target mobile station.

(Supplementary Note 19) The allocation apparatus according to any one of Supplementary Notes 15 to 18, wherein the selection means selects a mobile station the elapsed time of which is longer than or equal to a predetermined time as the target mobile station.

(Supplementary Note 20) The allocation apparatus according to Supplementary Note 19, wherein the mobile station includes notification means for performing notification of an uplink data congestion amount that is an uplink transmission data amount congested at the mobile station to the allocation apparatus, wherein the notification means performs the notification when the uplink scheduling is performed after the predetermined time has elapsed following previous performance of the notification.

(Supplementary Note 21) The allocation apparatus according to Supplementary Note 20, wherein the selection means further selects the target mobile station based on the uplink data congestion amount notified by the notification means.

(Supplementary Note 22) The allocation apparatus according to any one of Supplementary Notes 15 to 21, wherein the selection means selects the target mobile station based on the elapsed time, a mode of a predetermined protocol layer in the mobile station, and a downlink data congestion amount that is a downlink transmission data amount congested at the allocation apparatus.

(Supplementary Note 23) The allocation apparatus according to any one of Supplementary Notes 15 to 21, wherein the selection means selects the target mobile station based on the elapsed time, a mode of a predetermined protocol layer in the mobile station, and downlink allocation information about the plurality of mobile stations.

(Supplementary Note 24) The allocation apparatus according to Supplementary Note 22 or 23, wherein the predetermined protocol layer is at least one of an RLC layer, a transport layer, or an application layer.

(Supplementary Note 25) The allocation apparatus according to any one of Supplementary Notes 22 to 24, wherein the allocation apparatus includes protocol layer monitoring means for receiving mode information about the predetermined protocol layer from an external apparatus.

(Supplementary Note 26) The allocation apparatus according to any one of Supplementary Notes 15 to 25, wherein the communication system includes a configuration of SIPTO in which the allocation apparatus includes one or more of functions of a core network apparatus.

(Supplementary Note 27) The allocation apparatus according any one of Supplementary Notes 15 to 26, wherein the allocation apparatus is a base station.

(Supplementary Note 28) The allocation apparatus according to any one of Supplementary Notes 15 to 26, wherein the allocation apparatus is a control apparatus that controls a base station.

(Supplementary Note 29) A mobile station that is selected as a target mobile station that serves as a target for which an allocation apparatus performs uplink scheduling based on an elapsed time from a timing at which uplink scheduling was performed at a previous time.

(Supplementary Note 30) The mobile station according to Supplementary Note 29, including notification means for performing notification of an uplink data congestion amount that is a congestion amount of uplink transmission data congested at the mobile station to the allocation apparatus, wherein the notification means performs the notification when the uplink scheduling is performed after the predetermined time has elapsed following previous performance of the notification.

(Supplementary Note 31) An allocation method that selects a target mobile station that serves as a target for which uplink scheduling is to be performed from among a plurality of mobile stations, and selects the target mobile station based on an elapsed time from a timing at which the uplink scheduling for at least one mobile station of the plurality of mobile stations was performed at a previous time.

(Supplementary Note 32) The allocation method according to Supplementary Note 31, wherein the uplink scheduling for the target mobile station is performed.

(Supplementary Note 33) The allocation method according to Supplementary Note 32, wherein when a plurality of the target mobile stations is present, scheduling for the target mobile station the elapsed time of which is long is preferentially performed.

(Supplementary Note 34) The allocation method according to any one of Supplementary Notes 31 to 33, wherein an uplink transmission request sent from the mobile stations is received, and a mobile station that has sent the uplink transmission request is further selected as the target mobile station.

(Supplementary Note 35) The allocation method according to any one of Supplementary Notes 31 to 34, wherein a mobile station the elapsed time of which is longer than or equal to a predetermined time is selected as the target mobile station.

(Supplementary Note 36) The allocation method according to any one of Supplementary Notes 31 to 35, wherein the target mobile station is further selected based on an uplink data congestion amount that is an uplink transmission data amount congested at the mobile station.

(Supplementary Note 37) The allocation method according to any one of Supplementary Notes 31 to 36, wherein the target mobile station is selected based on the elapsed time, a mode of a predetermined protocol layer in the mobile station, and a downlink data congestion amount that is a downlink transmission data amount congested at the allocation apparatus.

(Supplementary Note 38) The allocation method according to any one of Supplementary Notes 31 to 36, wherein the target mobile station is selected based on the elapsed time, a mode of a predetermined protocol layer in the mobile station, and downlink allocation information about the plurality of mobile stations.

(Supplementary Note 39) The allocation method according to Supplementary Note 37 or 38, wherein the predetermined protocol layer is at least one of an RLC layer, a transport layer, or an application layer.

(Supplementary Note 40) The allocation method according to any one of Supplementary Notes 37 to 39, wherein mode information about the predetermined protocol layer is received from an external apparatus.

(Supplementary Note 41) A program that causes a computer to execute a selection step of selecting a target mobile station that serves as a target for which uplink scheduling is to be performed from among a plurality of mobile stations, wherein the selection step selects the target mobile station based on an elapsed time from a timing at which the uplink scheduling for at least one mobile station of the plurality of mobile stations was performed at a previous time.

(Supplementary Note 42) The program according to Supplementary Note 41, further causing the computer to execute a step of performing uplink scheduling for the target mobile station.

(Supplementary Note 43) The program according to Supplementary Note 42, causing the computer to preferentially perform scheduling for the target mobile station the elapsed time of which is long, when a plurality of the target mobile stations is present.

(Supplementary Note 44) The program according to any one of Supplementary Notes 41 to 43, causing the computer to execute a step of receiving an uplink transmission request sent from the mobile stations, wherein the selection step further selects a mobile station that has sent the uplink transmission request as the target mobile station.

(Supplementary Note 45) The program according to any one of Supplementary Notes 41 to 44, wherein the selection step selects a mobile station the elapsed time of which is longer than or equal to a predetermined time as the target mobile station.

(Supplementary Note 46) The program according to any one of Supplementary Notes 41 to 45, wherein the selection step further selects the target mobile station based on an uplink data congestion amount that is an uplink transmission data amount congested at the mobile station.

(Supplementary Note 47) The program according to any one of Supplementary Notes 41 to 46, wherein the selection step selects the target mobile station based on the elapsed time, a mode of a predetermined protocol layer in the mobile station, and a downlink data congestion amount that is a downlink transmission data amount congested at the allocation apparatus.

(Supplementary Note 48) The program according to any one of Supplementary Notes 41 to 46, wherein the selection step selects the target mobile station based on the elapsed time, a mode of a predetermined protocol layer in the mobile station, and downlink allocation information about the plurality of mobile stations.

(Supplementary Note 49) The program according to Supplementary Note 47 or 48, wherein the predetermined protocol layer is at least one of an RLC layer, a transport layer, or an application layer.

(Supplementary Note 50) The program according to any one of Supplementary Notes 47 to 49, causing the computer to execute a step of receiving mode information about the predetermined protocol layer from an external apparatus.

(Supplementary Note 51) A recording medium that is readable by a computer and that records the program according to any one of Supplementary Notes 41 to 50.

While the invention of the present application has been described above with reference to the exemplary embodiments, the invention of the present application is not limited by what are mentioned above. The configurations and details of the invention of the present application may be changed in various manners that a person skilled in the art can understand within the scope of the invention.

This application claims the benefit of the priority based on PTL No. 2013-025138 filed on Feb. 13, 2013, the disclosure of which is incorporated herein in its entirety by reference.

REFERENCE SIGNS LIST 10, 20, 50 Communication system
$11_1$ to $11_M$, $21_1$ to $21_M$ Mobile station
12 Allocation apparatus
13, 37, 39 Selection unit
$22_1$ to $22_M$ Notification unit
23, 51 Base station
24 Antenna unit
25 Reception unit
$26_1$ to $26_M$ Received signal processing unit
27 Reception quality measurement unit
28 Control information reception unit
29 Data reception unit
30 Scheduling unit
31 Mobile station management unit
32 Transmission data processing unit
33 Downlink transmission data generation unit
34 Sending unit
35 Uplink scheduling unit
36 Downlink scheduling unit
38, 40 Execution unit
52 Protocol layer monitoring unit

The invention claimed is:

1. An allocation apparatus comprising:
   a scheduler hardware configured to:
      select, from a plurality of mobile stations, a target mobile station based on a time elapsed from a previously-performed uplink scheduling for allocating a first uplink radio resource to at least one mobile station of the plurality of mobile stations, and
      perform an uplink scheduling for allocating a second uplink radio resource to the target mobile station; and
   a receiver configured to receive uplink data from the target mobile station, the uplink data being transmitted using the second uplink radio resource.

2. The allocation apparatus according to claim 1, wherein when there are a plurality of target mobile stations, the scheduler hardware preferentially performs scheduling for the target mobile station the elapsed time of which is longer in relation to the other target mobile stations.

3. The allocation apparatus according to claim 2, wherein the scheduler hardware selects a mobile station the elapsed time of which is longer than or equal to a predetermined time as the target mobile station.

4. The allocation apparatus according to claim 3, wherein the scheduler hardware selects the target mobile station based on the elapsed time, a mode of a predetermined protocol layer in the at least one mobile station, and downlink allocation information about the plurality of mobile stations.

5. The allocation apparatus according to claim 2, wherein the scheduler hardware selects the target mobile station based on the elapsed time, a mode of a predetermined protocol layer in the at least one mobile station, and a downlink data congestion amount that is a downlink transmission data amount congested at the allocation apparatus.

6. The allocation apparatus according to claim 5, wherein the scheduler hardware selects the target mobile station based on the elapsed time, a mode of a predetermined protocol layer in the at least one mobile station, and downlink allocation information about the plurality of mobile stations.

7. The allocation apparatus according to claim 2, wherein the scheduler hardware selects the target mobile station based on the elapsed time, a mode of a predetermined protocol layer in the at least one mobile station, and downlink allocation information about the plurality of mobile stations.

8. The allocation apparatus according to claim 1, wherein the scheduler hardware selects a mobile station the elapsed time of which is longer than or equal to a predetermined time as the target mobile station.

9. The allocation apparatus according to claim 8, wherein the mobile station comprises a processor configured to perform notification of an uplink data congestion amount that is an uplink transmission data amount congested at the mobile station to the allocation apparatus, and
wherein the processor performs the notification when the uplink scheduling is performed after the predetermined time has elapsed from previous performance of the notification.

10. The allocation apparatus according to claim 9, wherein the scheduler hardware selects the target mobile station based on the elapsed time, a mode of a predetermined protocol layer in the mobile station, and a downlink data congestion amount that is a downlink transmission data amount congested at the allocation apparatus.

11. The allocation apparatus according to claim 9, wherein the scheduler hardware selects the target mobile station based on the elapsed time, a mode of a predetermined protocol layer in the mobile station, and downlink allocation information about the plurality of mobile stations.

12. The allocation apparatus according to claim 8, wherein the scheduler hardware selects the target mobile station based on the elapsed time, a mode of a predetermined protocol layer in the mobile station, and a downlink data congestion amount that is a downlink transmission data amount congested at the allocation apparatus.

13. The allocation apparatus according to claim 8, wherein the scheduler hardware selects the target mobile station based on the elapsed time, a mode of a predetermined protocol layer in the mobile station, and downlink allocation information about the plurality of mobile stations.

14. The allocation apparatus according to claim 1, wherein the scheduler hardware selects the target mobile station based on the elapsed time, a mode of a predetermined protocol layer in the at least one mobile station, and a downlink data congestion amount that is a downlink transmission data amount congested at the allocation apparatus.

15. The allocation apparatus according to claim 14, wherein the scheduler hardware selects the target mobile station based on the elapsed time, a mode of a predetermined protocol layer in the at least one mobile station, and downlink allocation information about the plurality of mobile stations.

16. The allocation apparatus according to claim 1, wherein the scheduler hardware selects the target mobile station based on the elapsed time, a mode of a predetermined protocol layer in the at least one mobile station, and downlink allocation information about the plurality of mobile stations.

17. The allocation apparatus according to claim 16, wherein the predetermined protocol layer is at least one of a radio link control (RLC) layer, a transport layer, and an application layer.

18. A communication system comprising:
a plurality of mobile stations; and
an allocation apparatus comprising
a scheduler hardware configured to:
select, from the plurality of mobile stations, at least one target mobile station based on a time elapsed from a a previously-performed uplink scheduling for allocating a first uplink radio resource to at least one mobile station of the plurality of mobile stations, and
perform an uplink scheduling for allocating a second uplink radio resource to the target mobile station, and
a receiver configured to receive uplink data from the target mobile station, the uplink data being transmitted using the second uplink radio resource.

19. A mobile station comprising:
a receiver configured to receive information about a second uplink radio resource allocated to the mobile station, the mobile station being selected, from a plurality of mobile stations, as a target mobile station that serves as a target for which an allocation apparatus performs uplink scheduling, based on a time elapsed from a previously-performed uplink scheduling for allocating a first uplink radio resource to at least one mobile station of the plurality of mobile stations; and
a transmitter configured to transmit uplink data using the second uplink radio resource.

20. An allocation method comprising:
selecting, from a plurality of mobile stations, a target mobile station based on a time elapsed from a previously-performed uplink scheduling for allocating a first uplink radio resource to at least one mobile station of the plurality of mobile stations;
performing an uplink scheduling for allocating a second uplink radio resource to the target mobile station; and
receiving uplink data from the target mobile station, the uplink data being transmitted using the second uplink radio resource.

* * * * *